Nov. 26, 1968          E. L. PARR          3,412,808
VARIABLE PITCH PROPELLER FOR BOAT
Filed Oct. 6, 1967          3 Sheets-Sheet 1
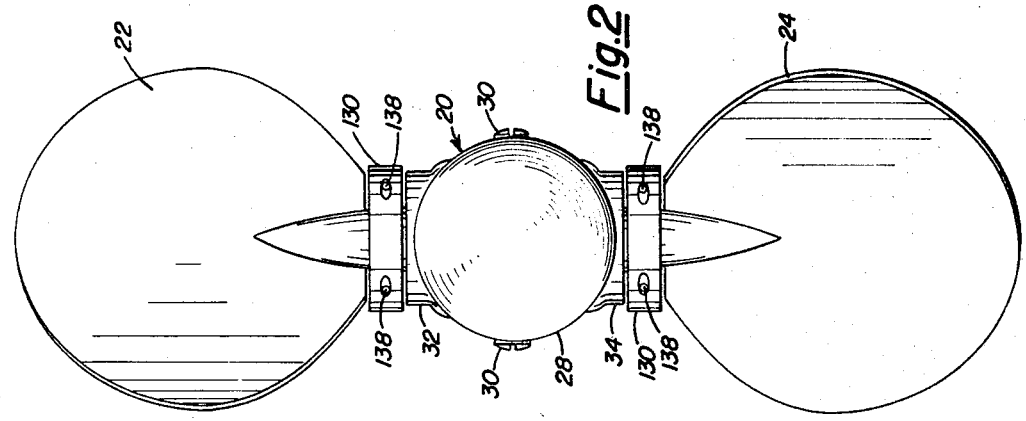
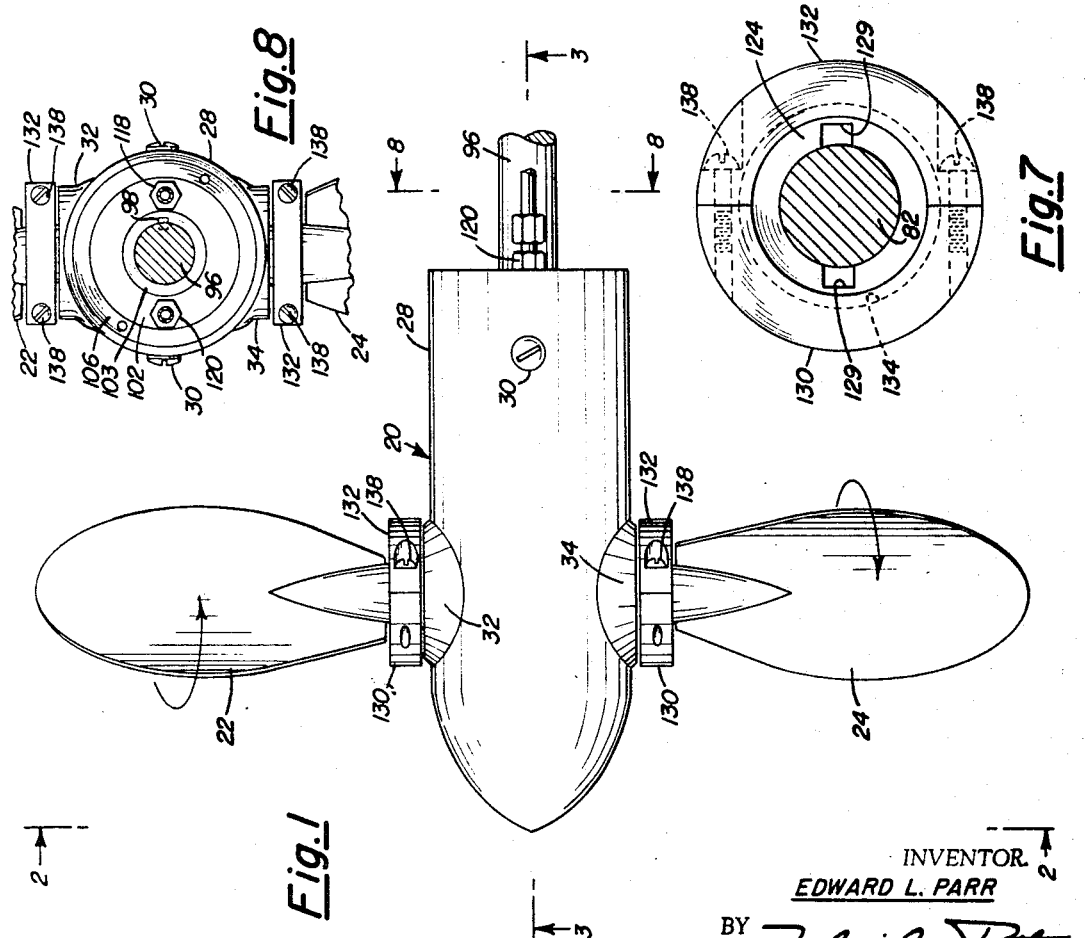
INVENTOR.
EDWARD L. PARR
BY
ATTORNEYS

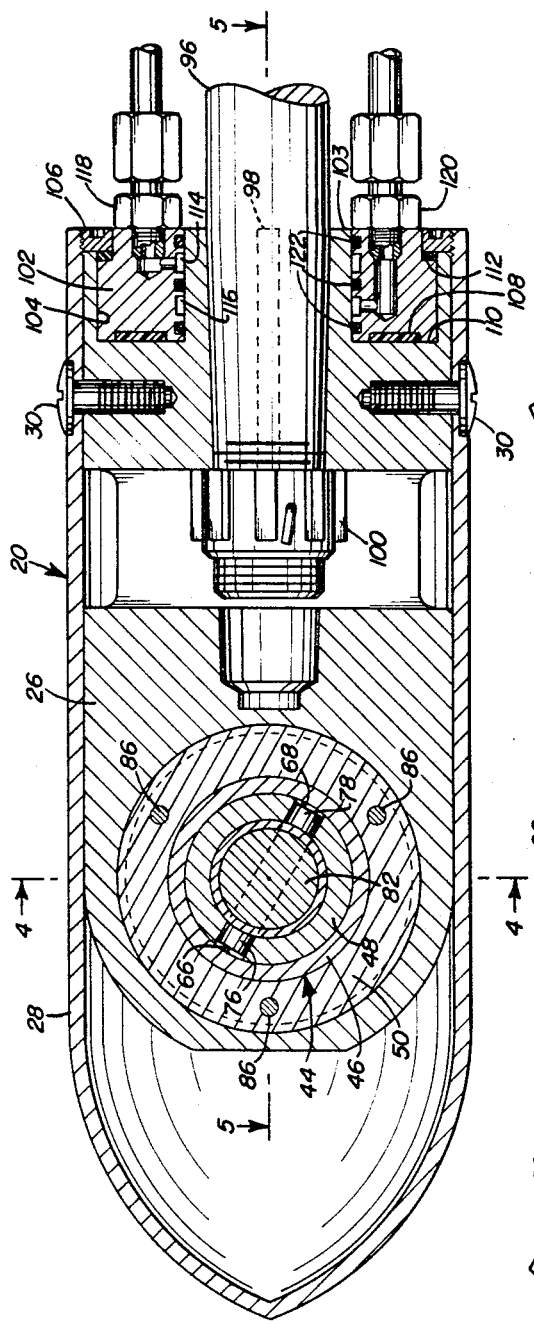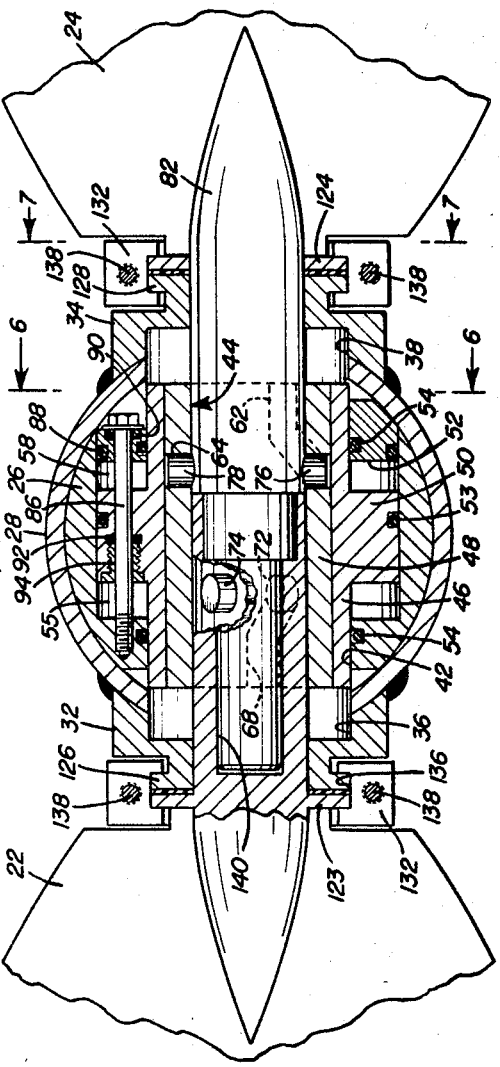

Nov. 26, 1968   E. L. PARR   3,412,808
VARIABLE PITCH PROPELLER FOR BOAT
Filed Oct. 6, 1967   3 Sheets-Sheet 3

INVENTOR.
EDWARD L. PARR
BY
ATTORNEYS

United States Patent Office 3,412,808
Patented Nov. 26, 1968

3,412,808
VARIABLE PITCH PROPELLER FOR BOAT
Edward L. Parr, El Cajon, Calif., assignor to
Wendell L. Thompson, Burbank, Calif.
Continuation-in-part of application Ser. No. 618,766,
Feb. 27, 1967. This application Oct. 6, 1967, Ser.
No. 677,830
7 Claims. (Cl. 170—160.31)

ABSTRACT OF THE DISCLOSURE

Mechanism for imparting a variable pitch to two propellers, employing a fluid actuated, reciprocating piston which when moved in either direction causes spiral and positive and simultaneous counter movements of equal value to be imparted to the two axially aligned propellers; one of the propellers having a bore for receiving and forming a bearing for the shank of the other propeller to thus provide bearings for one another.

---

The present application is a continuation-in-part of my copending application Ser. No. 618,766, filed Feb. 27, 1967, now abandoned.

The mechanism comprises a frame which forms a cylinder and it receives a fluid actuated piston of the reciprocating type. Linear movement of the piston in either direction causes concomitant counter spiral movements to be imparted to axially aligned shafts of the two propellers. One of the propellers is bored to receive and provide a stabilizing bearing and for receiving an axially aligned shank of the other propeller. While the piston may be provided with pins which are received by spiral grooves in the propellers, I prefer to provide grooves in the piston which receive pins on the propellers.

The prior art, such as that shown in the patents to Wilde, No. 2,490,329, and Willis et al., No. 2,527,112, required complicated gearing. While Willis et al. showed a piston for oscillating the two propellers, expensive wrist pins and connecting rods were deemed necessary. Moreover, the shafts of the propellers did not form bearings for one another.

Other prior art, such as that shown in the patents to Esson, No. 1,055,455, and Blount, No. 3,109,498, do not employ fluid for oscillating the propellers.

Other features and the advantages of the present invention will be apparent from the following description, reference being had to the accompanying drawings wherein a preferred embodiment of the invention is illustrated.

In the drawings:

FIG. 1 is a side view of the propellers and the frame which houses the mechanism for varying the pitch of the propellers, the propellers being shown in one of their near extreme turned positions;

FIG. 2 is a front view of the propellers and the frame shown in FIG. 1;

FIG. 3 is a sectional view taken along line 3—3 of FIG. 1, but on a larger scale, the main drive shaft being shown in elevation;

FIG. 4 is a sectional view taken along line 4—4 of FIG. 3, but showing the piston in a position immediately to one side of its center position;

FIG. 7 is a sectional view take along line 7—7 of FIG. 4, but omitting the shell of the frame and the propeller; and FIG. 8 is a sectional view taken along line 8—8 of FIG. 7, but omitting the major poritions of the propellers.

Figure 6:
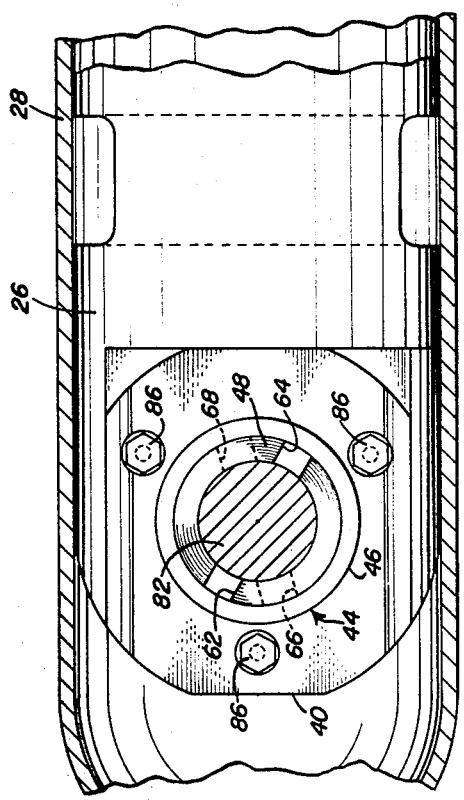
FIG. 6 is a fragmentary view showing the outer shell of the frame in section, the section being taken along line 6—6 of FIG. 1, the view being on a larger scale than in FIG. 1.
Figure 5:
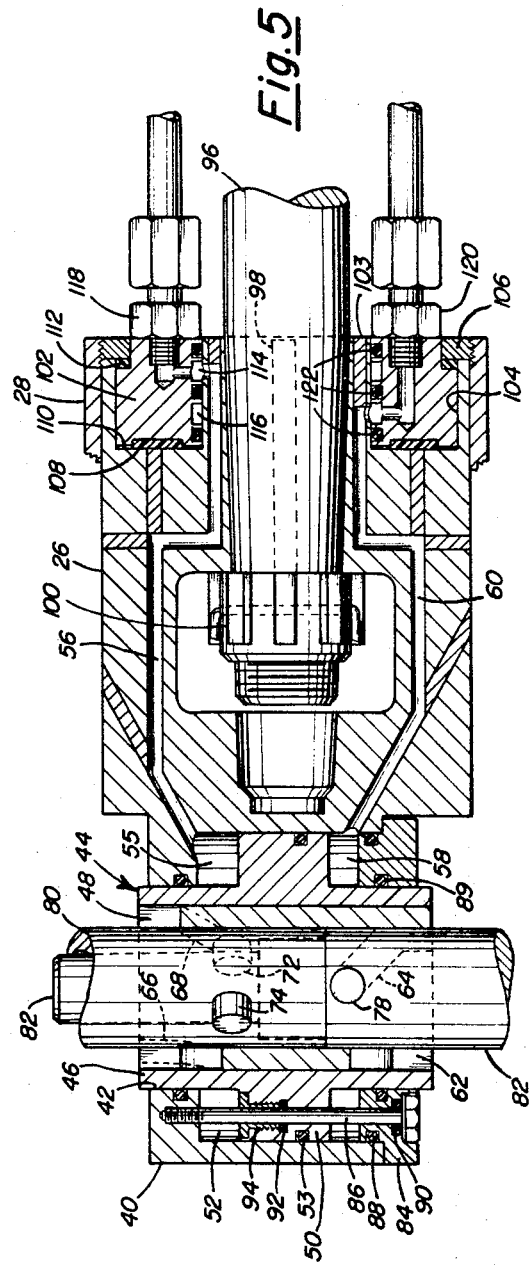
FIG. 5 is a sectional view taken along line 5—5 of FIG. 3, but showing the piston in a position immediately to one side of its center position.

Referring more in detail to the drawings, the frame 20, for the mechanism for varying the pitch of two propellers 22 and 24, includes a circularly-shaped main frame body in the form of a casting 26 and an outer circularly-shaped shell 28. They are secured to one another by screws 30. The shell 28 also includes aligned hollow protrusions 32 and 34 which are suitably welded to the exterior of the shell 28, providing axially aligned bearings 36 and 38, the common axis of which is disposed at right angles to the axis of the circular body 26.

The left end 40 of body 26 is bored at 42, the axis of the bore being aligned with the common axis of bearings 36 and 38. The bore 42 forms a guide for a reciprocating piston 44. The piston 44 includes two concentric hollow cylinders 46 and 48, suitably fixed to one another, and also includes a circular extension 50 formed integrally with the outer cylinder 46 and midway of the ends of the piston.

The body 26 is provided with an internal, cylindrically-shaped groove 52 extending radially outwardly of bore 42, the axis thereof coinciding with the axis of the bore 42. The circular piston extension 50 extends into the groove 52. The periphery of the extension is grooved to receive an elastic O-ring 53 to thereby provide a seal between the periphery of the extension and the cylindrical wall of the groove 52. The body is grooved to receive O-rings 54 to provide seals with the outer cylinder 46. The combination of the body 26 and the outer cylinder 46 of piston 44 transforms the groove 52 to a ring-shaped cylinder.

Fluid is admitted to and withdrawn from one side 55 of the ring-shaped cylinder 52 through a duct 56 and from the other side 58 through a duct 60. As viewed in FIG. 4, when fluid is admitted to side 55 and withdrawn from side 58, the piston 44 will be moved to the left, and when fluid is admitted to side 58 and withdrawn from side 55, the piston will be moved to the right.

The inner cylinder 48 is provided with four spiral grooves 62, 64, 66 and 68, each having a length equal to at least forty-five degrees about the circumference of cylinder 48. Two of these grooves 62 and 64 are at the left portion of the cylinder and spiral in opposite directions, the grooves being at one hundred and eighty degrees from one another. The other two grooves 66 and 68 are similarly fashioned at the right portion of the cylinder 48. The grooves 62, 64, 66 and 68 receive pins 72, 74, 76 and 89, respectively. Pins 72 and 74 are fixed to the periphery of hollow shaft 80 of propeller 22, and pins 76 and 78 are fixed to the shaft 82 of propeller 24. Pins 72 and 74 are disposed at one hundred and eighty degrees from one another, and pins 76 and 78 are likewise disposed with respect to one another. The grooves are so fashioned that when the piston 44 moves to the left, one of the propellers will be moved in a clockwise direction and the other in a counterclockwise direction, and vice versa when the piston moves to the right.

The end 58 of the ring-shaped cylinder 52 is closed by a cap 84 which is held in place by three equally spaced bolts 86 which are threaded into body 26. These bolts extend through the extension 50 of the piston to prevent oscillation of the piston. The periphery of the cap 84 is grooved to receive sealing O-ring 88 which contacts the body 26. The cap is grooved to receive sealing O-rings 89 which embraces the outer cylinder 46 of piston 44 and is counterbored about the holes for the bolts 86 for receiving sealing O-rings 90.

The extension 50 of the piston 44 is counterbored about the holes which receive the bolts 86 to receive O-rings 92. The counterbores are threaded for receiving the glands 94. Thus, leakage is prevented between opposite sides of the cylinder 52 along the bolts 86.

The frame 20 and propellers 22 and 24 are rotated by a shaft 96, the shaft being keyed to the body 26 by a key 98 and locked in position by a nut 100. The frame is rotatably carried by a stationary frame in the form of a ring 102, which latter is suitably supported, as for example near the stern of a ship or boat. The right end of the frame 20 is provided with a circular recess 104 for receiving the ring 102, and providing a hub 103 for the ring 102. A retaining ring 106 is threaded into the right end of the shell 28 so as to retain the frame, the propeller and the ring 102 in a cooperative position. A nylon ring 108 is interposed between the left side of ring 102 and the flat wall 110 of the body 26, and a nylon ring 112 is interposed between the right side of ring 102 and retaining ring 106. These rings 108 and 112 form thrust bearings between the ring 102 and the body 26.

Either the ducts 56 and 60 may each terminate in longitudinally disposed circular grooves for registering with ports in the stationary ring 102, however, I prefer to provide two longitudinally disposed circular grooves 114 and 116 in the interior wall of ring 102. The ducts 56 and 60, which are connected to opposite sides of cylinder 52, are connected, respectively, with the grooves 114 and 116. Fluid, such as oil, water or air, is connected with the grooves 114 and 116 by couplings 118 and 120, respectively. Three resilient O-rings 122 are employed for sealing opposite sides of grooves 114 and 116, and for sealing the grooves from one another.

Any desirable fluid translating mechanism (not shown) may be employed for forcing the fluid through coupling 118 and concomitantly out of coupling 120, and vice versa.

The propeller shafts 80 and 82 are provided with circular flanges 123 and 124, respectively and the protrusions 32 and 34 are provided with like flanges 126 and 128, respectively, which abut flanges 123 and 124, respectively.

The protrusions 32 and 34 are each provided, as seen in FIG. 7, with oppositely disposed grooves 129 at the inner surfaces through which the pins 72, 74, 76 and 78 can pass when withdrawing the propellers from the piston 44.

Flanges 122 and 126 are connected for oscillative relationship with one another through two complementing, substantially semi-circular elements 130 and 132. These elements are provided with complementing grooves 134 and 136 for receiving the flanges 122 and 126. When the elements are drawn toward one another by screws 138, they are in the form of a ring and clamp the flanges 122 and 126 therebetween to prevent longitudinal movement of the propeller 22 relative to the body 26. Like elements are provided for fastening the flanges 124 and 128 with one another to prevent longitudinal movement of the propeller 24 relative to the body 26.

Teflon ring-shaped disks 139 are disposed, respectively, between the flanges 123 and 126 and between flanges 124 and 128.

The propeller shaft 80 is bored at 140 for snugly receiving the axially concentric shank 142 of propeller shaft 82. Thus, the shafts 80 and 82 provide elongated bearing surfaces for one another which supplements the bearing provided by the inner surface of the inner cylinder 48 of piston 44.

From the foregoing, it is apparent that when the piston 44 is in its neutral position, i.e., midway of the ends of the cylinder 52, the propellers are likewise in their neutral positions, resulting in no forwardly or rearwardly propelling effect. The shifting of the piston in one direction from neutral, causes forward propelling action in equal degree to be imparted by both propellers. The shifting of the piston in the opposite direction from neutral, causes rearward propelling action in equal degree to be imparted by both propellers. The degree of propelling action, in either direction, is increased as the piston is shifted farther from neutral position.

From the foregoing, it is apparent that I have provided and efficient, inexpensive and reliable mechanism for shifting two propellers in opposite directions. Moreover, the spiral groove and pin mechanism, providing the oscillating movement of the propellers, and the bearing arrangement for the propellers provide a mechanism which is simple in construction, and easy to assemble or disassemble.

Further, it will be observed that damaged propellers can be removed readily and others substituted although they are under water. Moreover, water cannot leak into the fluid motor or actuating fluid cannot escape from the fluid in the motor, since the sealing rings 53 and 54 prevent such interchange.

While the form of embodiment herein shown and described constitutes preferred form, it is to be understood that other forms may be adopted falling within the scope of the claims that follow.

I claim:
1. A combination comprising:
   (A) two rotatable propellers having a common axis;
   (B) mechanism for causing positive and simultaneous oscillation of the propellers about their axis including:
      (1) a frame forming a hollow cylinder concentrically aligned with the axis of the propellers and having fluid ducts connected with the opposite sides of the cylinder;
      (2) a single reciprocating member in the cylinder and disposed for movement longitudinally of the axis of the cylinder;
      (3) means forming positive and simultaneously operable spiral driving mechanism between the reciprocating member and both of the propellers;
   (C) means for rotatably supporting said first mentioned mechanism.

2. A combination as defined in claim 1, characterized in that the reciprocating member is provided with a longitudinally extending bore and that each of the propellers includes:
   (A) (1) a member forming a shaft extending into the bore;
   and further characterized in that certain of said members includes a plurality of spiral grooves whose axes are concentrical with the bore and that certain of said members includes pins extending into the grooves.

3. A combination as defined in claim 1, characterized in that the reciprocating member is provided with a longitudinally extending bore and that each of the propellers includes:
   (A) (1) a member forming a shaft extending into the bore;
   and further characterized in that the reciprocating member is provided with a plurality of inwardly open spiral grooves whose axes are concentric with the axis of the bore, and that the members in the bore are each provided with a pin extending into the groove.

4. A combination as defined in claim 1, characterized in that the reciprocating member is provided with a longitudinally extending bore and each of said propellers includes:
   (A) (1) a member forming a shaft extending into the bore, one of the last mentioned members including an axially extending shank whose axis is concentric with the bore, and the other of the last mentioned members being bored axially with respect to the axis of the shank forming a bearing, said shank extending into the last mentioned bore.

5. A combination as defined in claim 1, characterized in that the means (C) for supporting the first mentioned mechanism includes:
   (1) a ring-shaped frame having ducts therein, separately connectable with a source of fluid;
   the ducts of one of said frames terminating into circularly-shaped grooves which register, separately and respectively, with the ducts in the other frame.

6. A combination as defined in claim 5, characterized in that the circularly-shaped grooves are formed in the ring-shaped frame.

7. A combination as defined in claim 5, characterized in that the end of the frame (B) (1), opposite the propeller is provided with a circular recess whose axis is aligned with that of the cylinder, the inner wall of the recess providing a hub for supporting the first mentioned frame (B) (1) by the stationary frame.

References Cited

UNITED STATES PATENTS

| | | | |
|---|---|---|---|
| 2,236,201 | 3/1941 | Rupp | 170—160.11 |
| 2,415,421 | 2/1947 | Filippis | 170—160.11 |
| 2,502,041 | 3/1950 | Geyer et al. | 170—160.31 |
| 2,702,602 | 2/1955 | Van Ommeren | 170—160.33 |

FOREIGN PATENTS

| | | |
|---|---|---|
| 703,319 | 3/1941 | Germany. |
| 18,445 | 1897 | Great Britain. |
| 499,518 | 1/1939 | Great Britain. |

EVERETTE A. POWELL, JR., *Primary Examiner.*